United States Patent

Pearson

[15] 3,673,439

[45] June 27, 1972

[54] RESETTABLE TIMING CIRCUIT

[72] Inventor: Samuel Reader Pearson, Farmers Branch, Tex.

[73] Assignee: Texas Instrument Incorporated, Dallas, Tex.

[22] Filed: Jan. 5, 1971

[21] Appl. No.: 103,964

[52] U.S. Cl. ..............................................307/293, 307/273

[51] Int. Cl. ......................................................H03k 17/26

[58] Field of Search .....................307/273, 293; 328/55, 207

[56] References Cited

UNITED STATES PATENTS

| | | | |
|---|---|---|---|
| 3,201,602 | 8/1965 | Norwalt | 307/293 X |
| 3,317,755 | 5/1967 | Briley | 307/293 X |
| 3,403,268 | 9/1968 | Beckner et al. | 307/293 |
| 3,436,682 | 4/1969 | Birnbaum | 307/273 X |
| 3,353,034 | 11/1967 | Betz et al. | 307/293 X |
| 3,260,864 | 7/1966 | Nourney | 307/293 |
| 3,346,746 | 10/1967 | Gordon | 307/273 |
| 3,358,236 | 12/1967 | Weber | 307/293 X |
| 3,578,988 | 5/1971 | Slowikowski | 307/273 X |

*Primary Examiner*—Stanley D. Miller, Jr.
*Attorney*—James O. Dixon, Andrew M. Hassell, Harold Levine, Melvin Sharp, Michael A. Sileo, Jr., Henry T. Olsen, Gary C. Honeycutt, Richard L. Donaldson and John E. Vandigriff

[57] ABSTRACT

A timing circuit is disclosed wherein a single output pulse is generated after a preselectable delay. In response to a first programmed input, the output pulse occurs after a first delay, while control circuitry modifies the duration of the delay in response to a second programmed input. Generation of the output pulse automatically resets the timing circuit so that a new timing cycle may be initiated.

1 Claim, 5 Drawing Figures

INVENTOR
Samuel Reader Pearson

RESETTABLE TIMING CIRCUIT

BACKGROUND INFORMATION AND SUMMARY OF INVENTION

This invention pertains to electrical timing circuits in general and, more specifically, to a resettable circuit having a variable time delay.

Various applications in the electronic industry require resettable delay circuits that provide a single pulse output after a predetermined time interval. Such circuits are conventionally referred to as "one-shot" delay circuits. Often it is desirable to have varying amounts of delay before the output pulse is initiated. To date, different delays have been produced by using, for example, two "one-shot" circuits and summing their outputs. The output of one circuit provides a first delay while the output of the combined circuits provides a longer delay. A major deficiency of such a technique, however, is the fact that the delay cannot be varied over a range; only two choices are available.

This deficiency is particularly deleterious in an automatic data retrieval and display system. One such system, for example, comprises a desk top, self-contained microfische file reader. A rotary storage file provides microfische storage for the internal file of the system. When it is desired to view a preselected microfische, the code of that microfische is entered via a keyboard and a view button is activated to initiate a view cycle. Electromechanical relays and logic circuitry are thereby activated to control operation of the file so that the desired microfische may be selected. When the desired microfische is rotated to a position adjacent to the display means, additional circuitry is activated to stop the file, spread the microfische apart so that the desired microfische is exposed for easy access, and to automatically position the microfische to an index display position. Each microfische, for example, may have 98 separate frames of microfilm. The index position catalogues the contents of the other 97 frames. From this index, the user can select the frame he wishes to view and enter the coordinate location of that frame via a second keyboard to control servo motors that position the microfische so that the desired frame is displayed. When no microfische is selected, the output of a one-shot circuit terminates the view cycle after a predetermined delay. Further, to facilitate removal of microfische from the file by the user, the motor is controlled to stop after a predetermined (preferably variable) delay. A programmable delay, resettable, one-shot circuit is required to most effectively provide this control. The term programmable delay circuit is used herein to refer to a circuit that provides different variable delays in response to preselected, that is, programmed inputs.

Accordingly, it is an object of the present invention to produce a resettable one-shot delay circuit having a variable delay.

Briefly and in accordance with the present invention, a resettable one-shot circuit having a programmable delay capability is provided. The circuit comprises pulse forming means for producing the one-shot action after a predetermined delay. In response to a preselected input, control means modify operation of the pulse former means to provide a variable delay to the one-shot pulse.

Novel features believed to be characteristic of this invention are set forth in the appended claims. The invention itself, however, as well as other objects and advantages thereof may best be understood when read in conjunction with the following detailed description of illustrative embodiments by reference to the accompanying drawings in which:

DETAILED DESCRIPTION

For clarity of description, the function and operation of the programmable delay one-shot circuit of the present invention will first be described. The circuit will then be described as it operates in the automatic data retrieval and display system above referenced. It is understood, of course, that this illustrative embodiment is by way of example only and that the delay resettable one-shot circuit may be utilized in other systems as desired.

Figure 4:
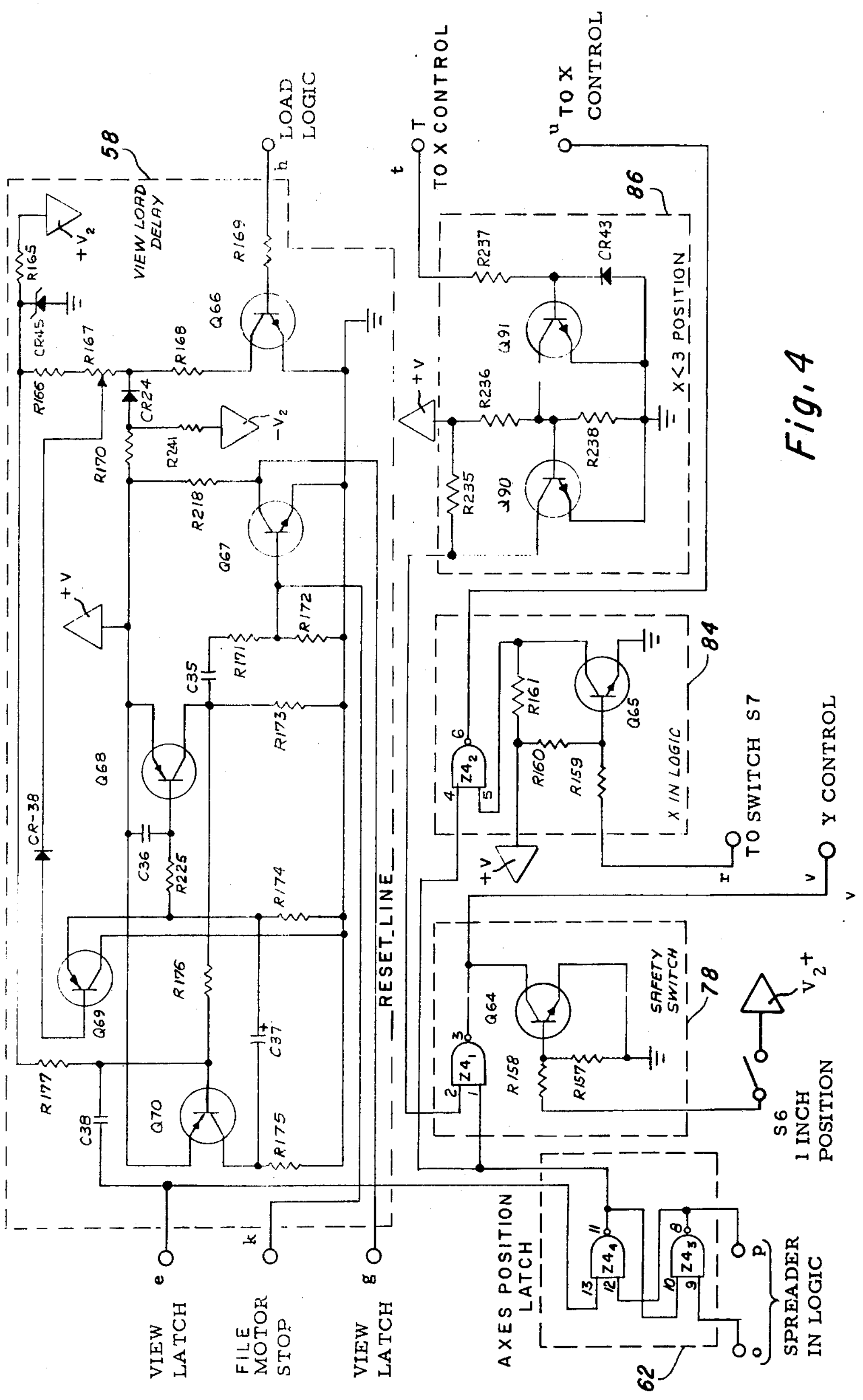
FIG. 4 schematically depicts the delay resettable one-shot circuit of the present invention.

With reference now to FIG. 4, the programmable delay resettable one-shot circuit comprises transistors Q66–Q70, resistors R165–R177, R218, R225 and R241, capacitors C35–C38, diodes CR24, CR38, and CR45, and power supply voltages +V, $+V_1$ and $-V_1$. Transistors Q68 and Q70 form the one-shot action, transistor Q67 functioning as the pulse former. The +V power supply provides transistor biasing and may, for example, be 5 volts DC. The value of the plus and minus supply $V_1$ is not critical, and a rectified, unregulated, unfiltered 20 volt supply may be utilized.

In operation, a negative pulse input to terminal A is AC-coupled to the base of pnp transistor Q70 momentarily biasing this device into conduction, thereby coupling a positive pulse through capacitor C37. This positive pulse is applied to the base of pnp transistor Q68, which is normally biased to be in the "on" state. The positive pulse from capacitor C37 drives the collector of Q68 to a more negative value. Positive feedback from the collector of transistor Q68 to the base of transistor Q70 is provided by resistor R176. This feedback ensures that both transistors completely change state, that is, transistor Q70 is completely biased "on" and transistor Q68 is biased "off." They will remain in the changed state until capacitor C37 discharges through resistor R174 to a sufficiently low voltage which will allow Q68 to begin to turn on again. As Q68 begins to turn on, the positive feedback effect causes transistor Q68 to return to its normally "on" state and transistor Q70 to return to its normally "off" state. The output of transistor Q68 is AC-coupled to the base of npn transistor Q67 by capacitor C35 and resistor R171. Transistor Q67 is biased on during the interval required to charge capacitor C35, providing an output pulse at terminal C. When capacitor C35 becomes charged, transistor Q67 turns off, hence the one-shot output pulse.

The timing function of the one-shot circuit, that is, the amount of delay, is controlled by capacitor C37 and resistor R174. In the normal untriggered state, that is, prior to a negative pulse at input A, the potential at the collector of Q70 is ground potential and the potential at the junction of capacitor C37 and resistor R174 is approximately +V. In the triggered state, Q70 saturates and the potential at the collector of Q70 goes to approximately V and the potential at resistor R174 simultaneously goes to approximately twice the value of V. The timing function of the one-shot circuit is determined by the time it takes resistor R174 to discharge capacitor C37 back to a potential slightly less than the value of V. The values of capacitor C37 and resistor R174 may be chosen to effect a desired delay of, for example, 6–7 seconds. The function of capacitor C36 is to prevent noise and transient spikes from inadvertently triggering the one-shot output.

The time span of the one-shot delay may be modified by the action of transistors Q69 and Q66. In the first mode of operation, the action of resistor R166, potentiometer 167 and resistor R168 have no effect on the circuit operation since npn transistor Q66 is normally biased off. Thus, the base of pnp transistor Q69 is biased with a voltage of, for example, +10 volts as governed by zener diode CR45 and the voltage drop through diode CR38. However, if the one-shot circuit is in operation, that is, an input has been received at terminal A, and transistor Q66 is biased into conduction by a signal at terminal E, the duration of the one-shot delay may be modified by biasing Q69 into conduction, thereby discharging capacitor C37 and enabling Q68 to again be biased on. Potentiometer R167 controls the bias applied to the base of transistor Q69 when transistor Q66 is saturated and thereby controls the amount of time required to sufficiently discharge capacitor C37 to effect the one-shot output.

Resistors R170 and R241 create external biasing for the modification portion of the one-shot circuit while diode CR24 provides temperature compensation for the effects of transistors Q70, Q68, Q69 and diode CR38. Resistor R165 limits the current through diode CR45, and resistor R169 provides isolation for transistor Q66.

In operation in the automatic data retrieval and display system previously described, the input at terminal A is provided in response to activation of a view cycle to initiate a timing cycle or delay of approximately 7 seconds after which the pulse forming transistor Q67 is biased on to provide a reset signal to terminal C to terminate the view cycle. Whenever a microfische is selected for display during a view cycle, a signal for immediate termination is applied to terminal B. The input to terminal E is provided by activation of a load cycle. Preferably, variable resistor R167 is set to provide a delay of approximately ½ second prior to activation of a reset pulse from transistor Q67 which is applied to output C to terminate the rotary file rotation.

Figure 1:
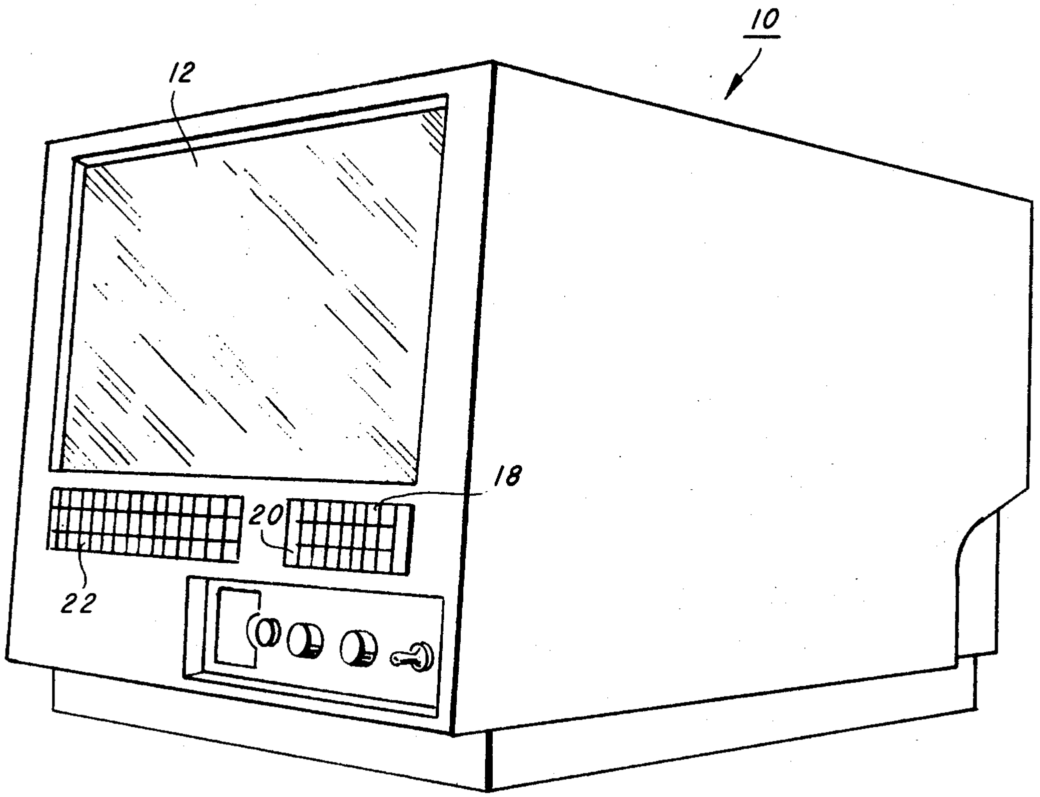
FIG. 1 is a pictorial illustration of a compact automatic data retrieval system in which the resettable timing circuit of the present invention may be utilized.
Figure 1A:
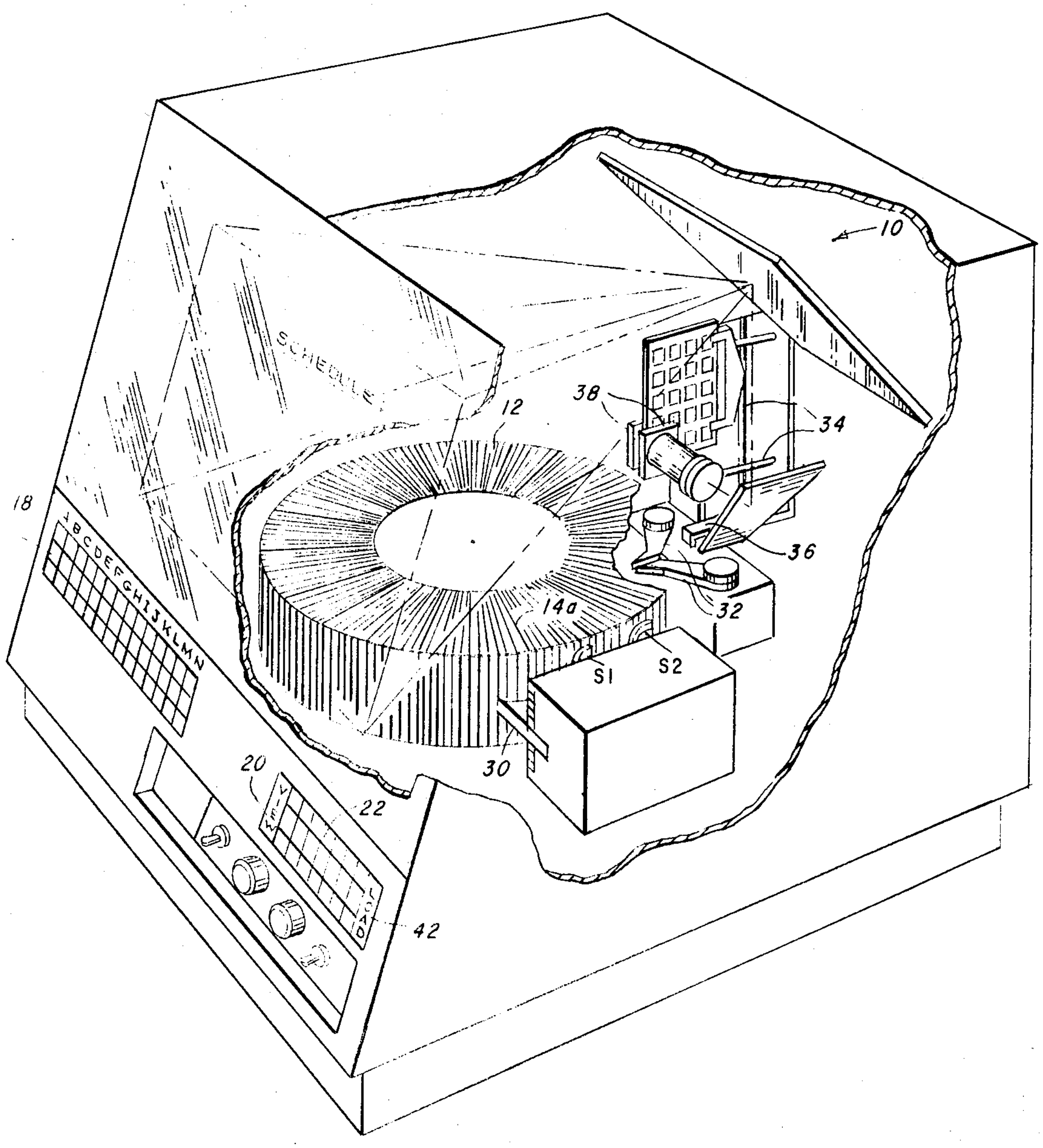
Figure 2:
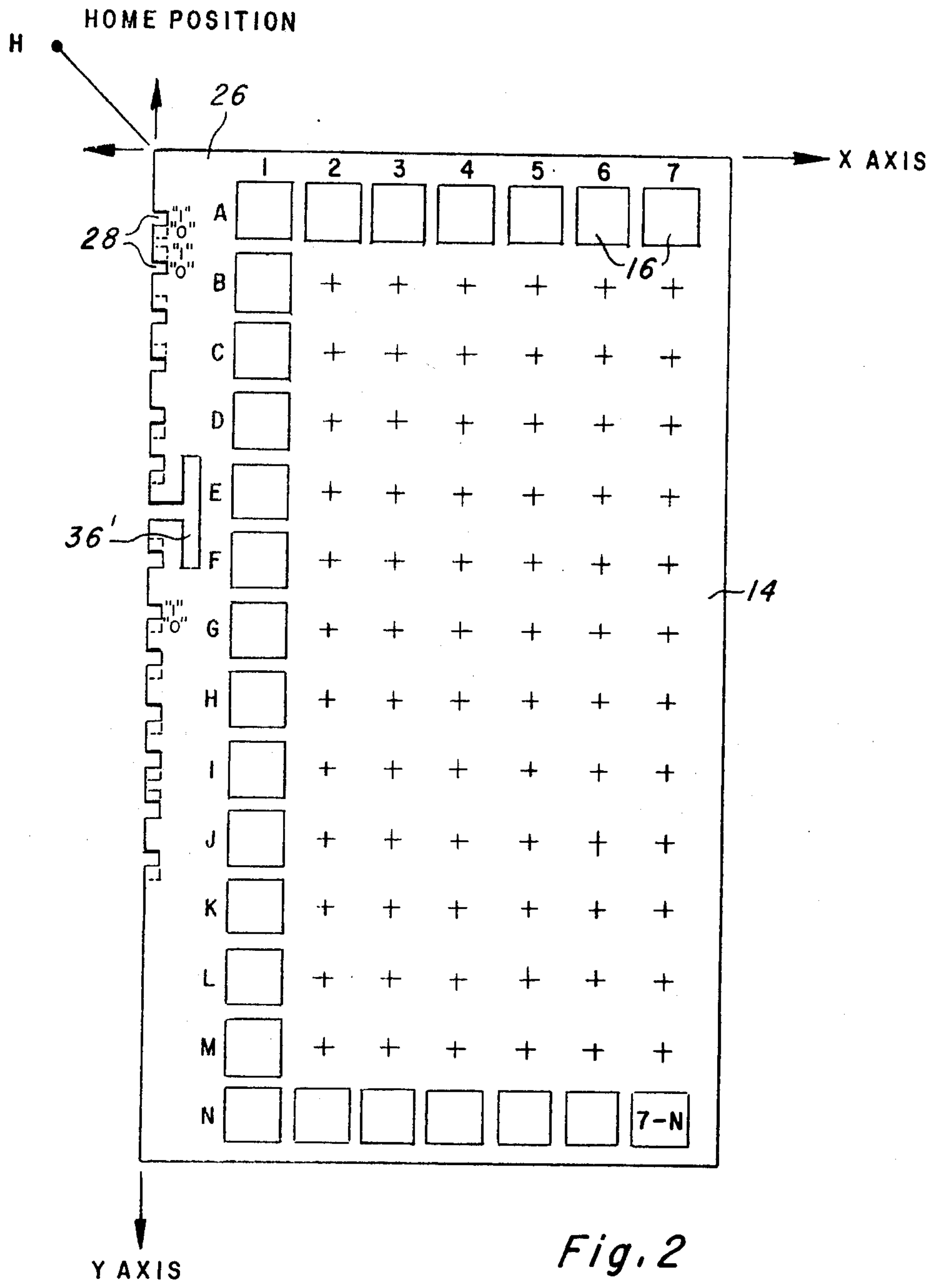
FIG. 2 illustrates a microfische that may be utilized with the data retrieval system shown in FIG. 1.

Referring now to FIGS. 1 and 2, there is pictorially illustrated an illustrative embodiment of the resettable delay circuit of the present invention. A compact automatic data retrieval display system is shown generally at 10. A microfische rotary file storage unit is shown at 12. This unit comprises the internal data storage capability of the display system and may, for example, have a storage capability of 100 or more separate microfische. The file comprises a plurality of radially extending storage locations disposed around a central axis. A representative microfische is depicted in FIG. 2 at 14. The microfische contains a plurality of frames of microfilm shown generally at 16. In the example illustrated, the microfische 14 contains 98 separate frames of microfilm arranged in a coordinate 7 × 14 alphanumerically designated array. For example, the frame in the upper lefthand corner of the microfische has a location defined by the coordinate position 1-A. In the preferred embodiment position 1-A is an index location and the logic circuits of the display system are arranged to automatically display the microfilm at that location whenever the microfische is initially selected. The index frame of microfilm catalogues the contents of the other 97 frames of microfilm on the microfische by coordinate location. Thus, the user can determine the coordinate location of the information he desires and effect display of this information by entering the location of the display keyboard 18 and pressing the view bar 20.

A discrete microfische may be selected for display utilizing a master index that provides the user with a code to enter via a second select keyboard 22. For example, in one application the file storage 12 may contain data relative to hotel reservations. The use may desire information about hotels in Miami, Fla. Referring to a master index under hotels, Florida, he would obtain a code, for example of "Hotel, A-3." In the given example, the keyboard 22 would have three sections corresponding to the type of data (i.e., hotels, etc.) and a alphanumeric sections. The data would be entered on keyboard 22 and the view button 20 activated. A selector section 24 is activated responsive to the code entered via keyboard 22. The selector section 24, for example, may comprise 13 selector bars which may individually be activated or not to effect a 13-bit binary code. That is, if activated, a selector bar is moved in position and may represent a binary "1." If not activated, it remains stationary and represents a binary "0." Each microfische 14 has on the edge adjacent the selector section 24 a metal tab 26. Grooves, shown generally at 28, are formed in the edge of the metal tab 26 on each microfische 14 to correspond to a unique binary code for each microfische. Microfische 14 in FIG. 2 is illustrated as having a binary code of 1000110111101.

Assuming, in the above example, that this microfische corresponds to "Hotels, A-3" entered via keyboard 22, the selector bars of selector section 24 would be set to correspond to the binary code 1000110111101. The selector section 24 magnetically attracts the metal tab 26 of all of the microfische in the file 12 as they are rotated past the selector section. However, only the grooves of the selected microfische are aligned with the selector bars and only this microfische is withdrawn from the file storage position. The grooves 28, for example, may be about ¼ of an inch in depth, allowing the microfische to be extracted this distance.

Responsive to the view bar 20 being depressed, a kicker bar 30 operates to push any previously selected microfische (which extends about ¼ of an inch from the file) back into the storage position to prevent damage to the microfische during subsequent rotation of the file in search of the newly selected microfische. When the selected microfische is rotated so as to underlie the selector section 24, the microfische is pulled out about ¼ of an inch and activates slow speed switch S1 which slows the file rotation to a predetermined regulated speed. As the microfische is rotated further, a second switch S2 is activated. This switch enables circuitry that stops the file rotation in a preselected location so that the selected microfische may be retrieved. A spreader 32 isolates the selected microfische from other microfische in the file storage and the X, Y servo mechanism, shown in block format 34, positions a hook 36 into a corresponding a slot 36′ of the microfische. The microfische at this location is said to be in the "home" position. The X, Y servo 34 then automatically positions the microfische against the platen 38 to display the index, that is, 1-A, frame of microfilm. Display optics 40 display the microfilm on the screen 12.

Referring again to the example, the index page may catalogue the coordinate location (on the microfische) of all the cities in Florida. Assume that Miami is contained on the frame of microfilm at location 1-K. This information would be entered via display keyboard 18 and would apply driving voltages proportional to the coordinate location to the X, Y servo motors. The desired frame of microfilm would be displayed about 1.2 seconds later.

Functional Description

Figure 3:
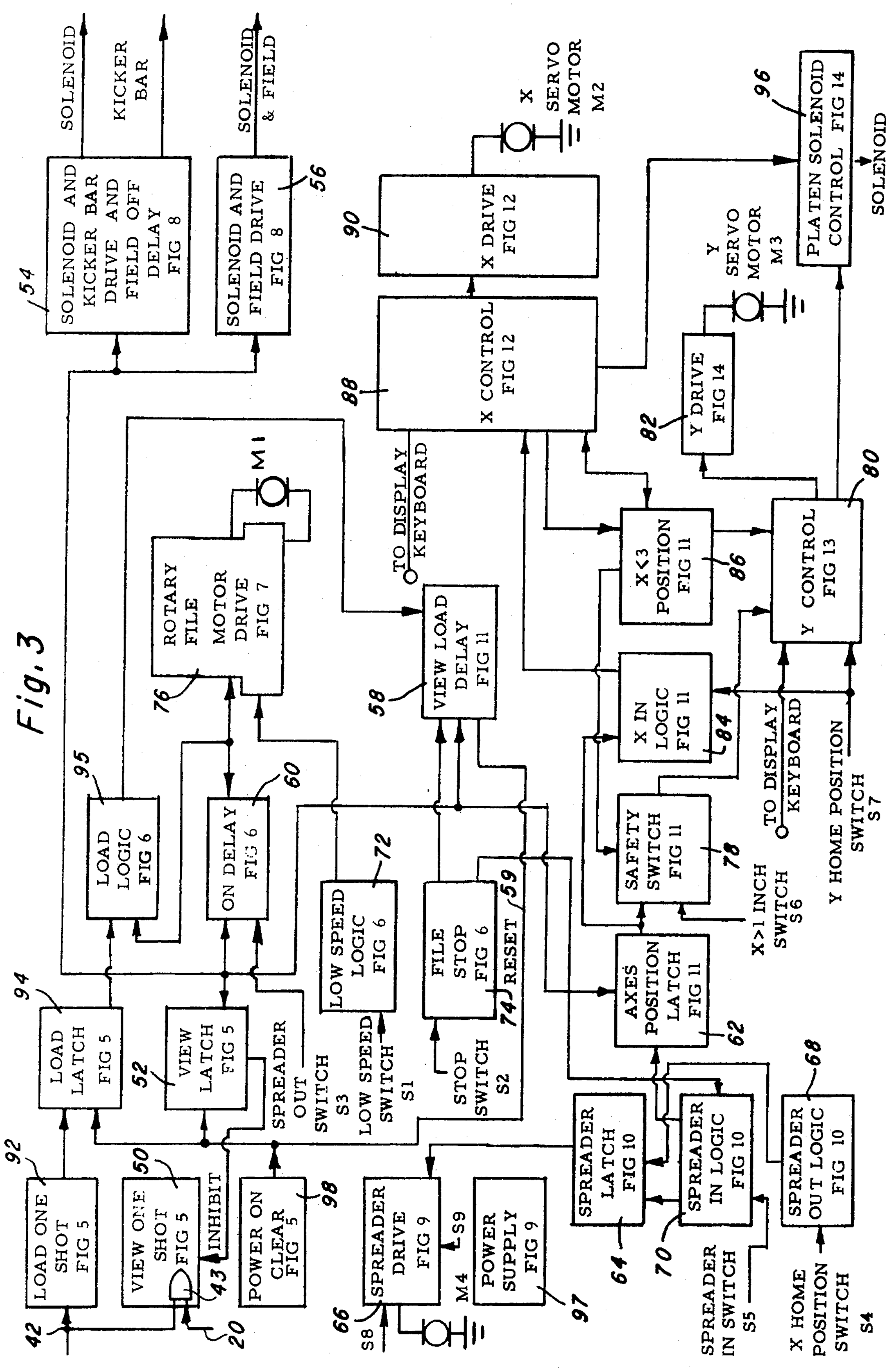
FIG. 3 depicts in functional block diagram format the logic and drive circuitry of the system illustrated in FIG. 1.

Referring now to FIG. 3, there is depicted in functional block diagram format the logic and driving circuits of the compact automatic data retrieval and display system above described. The data display system exhibits extremely fast data access and, since it utilizes all solid state logic and drive circuits, does not experience the large number of mechanical failures associated with conventional electromechanical display systems. The functional blocks will be described essentially in order of operation during a normal view cycle.

View One Shot — The function of the View One Shot circuit 50 is to provide a signal that initiates a "view cycle" when either the "view" or "load" bars 20 or 42 of the keyboard 18 (FIG. 1) are activated. Once a view cycle is activated, this circuit operates to inhibit subsequent signals responsive to inadvertent activation of either the view button or load button. At the end of a view cycle, the circuit 50 is enabled so that when either the view or load button is again depressed, a new view cycle may be initiated. The output of circuit 50 is a single pulse that is applied to the View Latch circuit 52. A pulse **120*b* (FIG. 4), resulting from either the view bar or load bar being activated during a view cycle, is descriptively labeled noise since it is inhibited by the View One Shot circuit 50** and has no effect on circuit operation.

View Latch — The View Latch 52 is enabled by the output pulse of the View One Shot circuit 50 and is set to a predetermined logic state responsive thereto. The latch 52 remains in this logic state until completion of the view cycle and during that time provides an "inhibit" signal to the View One Shot circuit so to preclude further "view cycle initiate" output pulses therefrom. When a view cycle is completed, the latch 52 is reset via a signal from the View Load Delay 58, thus removing the inhibit signal. The output of the latch 52 is an enable signal that persists until the latch is reset at the end of the view cycle.

This enable signal is simultaneously applied to the On Delay circuit 60, the Solenoid and Kicker Bar Drive and Field Off Delay circuit 54, the Solenoid and Field Drive circuit 56, the View Load Delay circuit 58 and the Axes Position Latch 62.

Solenoid, Kicker Bar Drive and Field Off Delay — The function of the block 54 labeled Solenoid and Kicker Bar Drive and Field Off Delay is to control energization of the selector and kicker bar solenoids when locking type selector bars are utilized and to ensure that field drive is applied to the file motor M1 for a predetermined period of time, such as, for example, 30 milliseconds, after the file motor is stopped subsequent to selection of the desired microfische. The purpose of the Kicker Bar drive is to return any previously selected microfische to the file storage position prior to energization of the file motor M1, since otherwise any previously selected microfische (which extends a preselected distance, e.g., ¼ of an inch, from the file housing) would be damaged as the file is rotated. A drive pulse of, for example, 120 milliseconds duration, is applied to the kicker bar solenoid. The selector bars are locked in place by the return of the kicker bar.

Solenoid and Field Drive — In some applications it may be desired to utilize selector bar solenoids of the non-locking type. These solenoids require continuous energization to maintain the selector bars in the desired binary code. The function of the Solenoid and Field Drive circuit 56 is to provide continuous drive power to these solenoids until after the microfische is selected, or until the view cycle is terminated, and to provide field power to the file motor M1.

View Load Delay — The "view cycle initiate" signal generated by the circuit 50 and "latched" by the View Latch circuit 52 is applied to the View Load Delay 58. This circuit is operative to perform two functions. First, the circuit terminates view cycle operation of the system when no microfische is selected within a predetermined time interval. In the illustrated embodiment described herein, the circuit 58 is designed to terminate the view cycle after approximately 3 revolutions of the file or about 7 seconds. The second function of the delay circuit 58 is to terminate the file motor M1 after approximately ½ second of file rotation when the load bar 42 is activated. In the present example, the file 12 (FIG. 1) rotates approximately ½ revolution during this time interval, thereby positioning the selected microfische in front of the viewing screen facilitating removal by the operator for updating, etc.

On Delay — The On Delay circuit 60 receives an input from the latch 52 signifying that a view cycle has been initiated. The On Delay circuit 60 is operative to provide a predetermined delay of, for example, 20 milliseconds during which time the field drive is applied to the file motor M1. The output of circuit 60 enables the File Motor Drive 76 which drives the file motor at maximum speed. An enable signal is also applied to the Logic circuit 95 to initiate timing of a load cycle when the load button 42 has been activated. The On Delay circuit 60 receives an input signal from the Spreader Out switch S3 which enables logic in the On Delay circuit 60 to provide power to the file motor M1. In other words, power cannot be applied to the file motor M1 until an input signal is received from both the Latch 52 and switch S3.

Axes Position Latch — The function of the Axes Position Latch 62 is to control the mode of operation of the X, Y servo mechanism to either the "home" position mode or the "display" mode. The output of the latch 52 is applied to the Axes Position Latch 62, and whenever a view cycle is initiated the output of the latch 52 indicates that the X, Y servos should operate in the home position mode. At this juncture it should be noted that before a selected microfische may be recovered from the file and displayed, any previously selected microfische positioned for display must be returned to the "-home" position in the file. Thus, in response to activation of the view bar 20, indicating that it is desired to display a selected microfische, the latch 52 sets the Axes Position Latch 62 such that a "home" signal is applied to the X, Y servo motors M2 and M3. The Axes Position Latch 62 remains set in the home mode until an input is received from the Spreader In Logic 70 indicating that the desired microfische has been selected and that the spreader 32 (FIG. 1) has been moved into position isolating the selected microfische for retrieval. The input from the Spreader In Logic 70 changes the logic state of the Axes Position Latch 62 terminating the home signal to the X, Y servo motors M2 and M3 and enabling the X Control 88 and Y Control 80 to position the selected microfische to the index, i.e., the 1-A position, for display.

Spreader Latch — The Spreader Latch 64 functions to control operation of the Spreader Drive Circuit 66. The logic state of the Spreader Latch 64 is set responsive to inputs from the Spreader In Logic 70 and the Spreader Out Logic 68. For example, when the inputs indicate that the spreader is to be positioned from the "out" position to the "in" position, the logic state of the Spreader Latch is set so as to provide an enable signal to the Spreader Drive to drive the spreader motor M4 to position the spreader to the "in" position.

Spreader Drive — The Spreader Drive Circuitry 66 provides power to the spreader motor M4 responsive to the enable signals received from the Spreader Latch 64. When the Spreader Latch 64 is set to one logic state, the Spreader Drive 66 output is negative, and when the latch 64 is set to the opposite logic state, the Spreader Drive output is positive.

Spreader Out Logic — During the time that a microfische is positioned for display, the spreader 32 remains positioned in the file. Assuming that at the initiation of a view cycle a previously selected microfische is still positioned for display, the Axes Position Latch 62 ensures that the microfische is returned to the file home position. As soon as the microfische is positioned in the file, an X Home Switch S4 provides an input to the Spreader Out Logic 68 indicating the spreader may now be withdrawn so that the file motor may be energized and the desired microfische selected. As will be explained in more detail hereinafter, the Y servo motor M3 is driven to the home position prior to driving the X servo motor M2 to the home position in order to prevent damage due to interference between the platen and the servo mechanism.

Responsive to the input from the home switch S4, the Spreader Out Logic 68 provides an enable signal to the Spreader Latch 64 changing the logic state thereof. The Spreader Latch 64 in turn provides an enable signal to the Spreader Drive 66, resulting in the Spreader 32 being driven to the "out" position.

Spreader In Logic — During a view cycle, any previously selected microfische is returned to the file, the Spreader 32 is withdrawn, and the file motor activated so that the new selected microfische may be retrieved. When the desired card is selected and the file 12 stopped, the Spreader 32 must be positioned in the "in" position to facilitate retrieval of the microfische. The Spreader In Logic 70 functions to provide an enable signal to the Spreader Latch 64, resetting the logic thereof, enabling the Spreader Drive 66 to position the Spreader 32 to the "in" position. To accomplish this function, the Spreader In Logic 70 receives an input from the File Stop circuit 74, indicating that a microfische has been selected and that the File 12 has ceased rotation. When the Spreader 32 is positioned to the "in" position, a Spreader In switch S5 is activated and is operative to provide an enable signal to the Axes Position Latch 62 to set the logic thereof to control operation of the X, Y servo motors M2 and M3 in the servo mode and to position the microfische to the 1-A index position.

Low Speed Logic — Once a microfische is selected, it is desirable to reduce the speed of the file 12 to a slow regulated speed in order to facilitate stopping the file with the selected microfische accurately positioned for retrieval by the X, Y servo mechanism 36 (FIG. 1). The function of the Low Speed Logic circuit 72 is to provide a signal to the File Motor drive 76 to effect this reduction of file speed. The Low Speed Logic circuit 72 receives an input from a Low Speed Switch S1 which is activated by the selected microfische. For example, the Low Speed Switch S1 may be mounted on the Selector 24 (FIG. 1) such that a selected microfische activates the switch S1 as the microfische rotates past it.

File Stop — The File Stop logic 74 is arranged such that two inputs from the switch S2 are required before an output signal is generated. The first input is generated when the stop switch S2 is activated by the selected microfische as it rotates over the switch. The second input results when the stop switch S2 is released after the microfische has passed. It is preferred that this logic arrangement be utilized since it is difficult to have precise positioning information from activation of the stop switch S2. On the other hand, very precise positioning may be obtained from the signal generated by deactivation of the stop switch. The output of the File Stop logic 74 is applied to the Spreader In Logic 70 to reset the status thereof to enable the Spreader 32 to be positioned into the File 12. An output signal is also provided to the File Motor Drive 76 via the View Load Delay 58, the reset line 59, the View Latch 52 and the On Delay 60 to initiate logic in the File Motor Drive 76 operable to effect application of dynamic braking to terminate file rotation in a position such that the selected microfische may be retrieved.

File Motor Drive — The purpose of the File Motor Drive 76 is to control operation of the file motor M1 responsive to the logic state of the On Delay circuit 60. One logic state of the On Delay 60 controls the File Motor Drive circuit 76 such that the File 12 rotates at maximum speed. This ensures that the desired microfische will be selected in the minimum time. Once the microfische is selected it activates the Low Speed Switch S1 providing an indication that the file is to be operated in a regulated slow speed mode. Responsive to the file stop signal from switch S2, the output from both the On Delay 60 and the Low Speed logic 72 are removed. This is accomplished by the File Stop circuit 74 providing a signal to the View Load Delay 58 terminating the timing cycle, signifying that a microfische has been selected. The View Load circuit 58 then provides a reset signal to the View Latch 52 changing the logic state thereof which in turn provides a logic signal to the On Delay circuit 60 removing the output therefrom to the File Motor Drive 76. At this juncture the File Motor Drive logic 76 assumes an integration mode during which time the speed of file rotation is sensed. The File Motor Drive 76 controls application of dynamic braking so that the file is stopped in a predetermined position such that the selected microfische is aligned for retrieval by the X, Y servo mechanism.

Safety Switch — During normal operation (servo mode), the X and Y servos are positioned such that no interference with the platen 38 can occur. However, to prevent the Y servo mechanism from interfering with the platen 38 when the X and Y servos are near the home position, it is desirable to lock the Y servo in the home position whenever the X servo is within a preselected distance, such as, for example, 1 inch from the home position. Thus, when the X and Y servo mechanism retrieves a microfische from the file home position, the Y servo drive is prevented from being applied until the X servo has been driven to a position X>1 inch. Similarly when a microfische is returned to the home position, the Y servo must be returned to the home axis prior to the X servo being positioned to a location closer than 1 inch. Control of the X and Y servos to accomplish this function is provided by the Safety Switch circuit 78. The output of this circuit is applied to the Y Control Circuit 80. The Safety Switch circuit 78 receives enabling logic inputs from the Axes Position Latch 62, the X>1 inch switch S6, and the X<3 Position circuit 86. The Axes Position Latch input functions to control whether the X and Y servos are to be positioned toward the home position or toward the display position. As will be explained in more detail with reference to the discussion of the X<3 Position circuit 86, the Y servo "home position" drive must not be applied until after X is less than position 3. When X is less than position 3, an input is applied to the Safety Switch 78 enabling the Y home drive 82 to be applied. It is imperative, however, that the X servo not be positioned to the home position until Y is home. The X>1 inch switch S6 controls the logic of the Safety Switch 78 to prevent the X servo from being positioned any closer to the home position than 1 inch until the Y bottom switch S7 indicates that the Y servo is home.

Y Control — The output of the Safety Switch 78 is applied to the Y control circuit 80. Responsive to the state of this output, the Y servo mechanism is set to operate in either the servo mode or the home position mode. When the servo mode of operation is indicated, an input is provided to the Y servo from the key bank 18 (FIG. 1) thereby providing to the Y servo motor M3 a voltage proportional to the Y coordinate display position desired. It is to be recalled that when a microfische is initially selected, a signal is automatically applied to drive the X, Y servos from the home position to a preselected index position such as X=1, Y=A. The frame of microfilm at this position is displayed and an index of the contents of the other 97 microfilm positions on the microfische is provided. The operator may select the microfilm frame he wishes to have displayed and enter this information to the system by way of, for example, keyboard 18 to provide an analog signal to the X, Y servo motors.

When the output of the Safety Switch 78 provides a signal to the Y Control Circuit indicating that the home position mode of operation is desired, the logic is arranged so as to apply a home voltage of, for example, −20 volts, to the Y servo motor M3 to rapidly drive the Y servo to the home position. A Y home position switch S7 provides an input to the Y control Circuit 80 when the Y servo has reached home, thereby terminating the Y home drive. The Y Control Circuit 80 also provides a signal to the Platen Solenoid Control circuit 96 in order to ensure that the platen solenoid is not energized during movement of the Y servo, thereby preventing damage to the microfische.

Y Drive — The Y Drive Circuit 82 amplifies the outputs from the Y Control Circuit 80 to servo motor levels. The output of the Y Drive Circuit 82 is applied directly to the Y servo motor M3.

X In Logic — The X In Logic circuit 84 functions to prevent the X servo from going to the home position until the Y servo has been positioned home. This is to ensure that the platen is not damaged by the X, Y servo mechanisms. There are two enable signals that form inputs to the X In Logic 84. The first signal is from the Axes Position Latch 62. As explained previously, the Axes Position Latch has two logic states, one state ensuring operation of the X, Y servos in the servo mode and the other logic state ensuring operation of the X, Y servos in the home position mode. When the home position mode of operation is desired, the Axes Latch 62 provides a signal to the X in circuit 84 setting the logic therein to a predetermined state. This logic is ANDed with the second input which is from the Y home position switch S7. The output of the ANDed logic signal is an enable signal to the X Control circuit 88, enabling X home drive voltage to be applied to the X servo motor M2.

X<3 Position — The function of the X<3 Position circuit 86 is to ensure that the selected microfische is not damaged by the lip of the file 12. This function is accomplished by preventing the Y servo from going to the home position; that is, the Y servo is controlled to go no further toward the home position than position A, until the X servo is less than a predetermined distance from the file that provides sufficient clearance, such as, for example, position 3. The X<3 Position circuit 86 receives a signal from the X Control circuit 88 indicating when the X servo is positioned at a location less than 3. When this occurs, an output signal is applied to the Safety Switch 78 which in turn enables the Y Control 80 to position the Y servo to the home position.

X Control — The purpose of the X Control circuit 88 is to provide proper enable signals to the X Drive 90, responsive to inputs from the X In Logic 84. In one logic state, the X In Logic circuit 84 sets logic in the X Control circuit 88 such that the X servo operates in the display, that is, servo mode. In this case, the X Control circuit 88 to an input from the keyboard 18 (FIG. 1) to determine the desired coordinate location. A second logic state of the X In Logic 84 sets logic in the X Control circuit 88 to enable operation of the X servo in the home position mode. The X Control logic 88 is arranged such that the X servo home drive is enabled until the X servo is driven to the X>1 inch position at which time the X home drive is terminated by operation of the Safety Switch 78 unless the Y servo is already in the home position.

A signal from the X Control circuit 88 is also applied to the Platen Solenoid Control 96 to ensure that the platen solenoid does not damage the microfische when the X servo motor M2 is in operation.

X Drive — Responsive to outputs from the X Control circuit 88, the X Drive 90 provides power to the X servo motor M2. When the servo mode of operation is desired, the drive signal is a function of the X coordinate display location selected. For example, a conventional linear resistor arrangement may be utilized and a voltage difference generated to drive the servo motor M2. When in the home position mode of operation, a continuous power supply voltage is utilized to rapidly drive the X servo to the home position.

Load One Shot — The load button 42 is utilized whenever the operator wishes to physically remove a selected microfische from the file storage 12 so that the microfische can be updated or replaced. To facilitate removal of the microfische, the load operation functions to locate the desired microfische away from the platen 38. The Load One Shot 92, the Load Latch 94, the Load Logic 95, and the View Load Delay 58 operate to accomplish this load function.

Responsive to activation of the load button 42, the Load One Shot 92 provides an enable pulse to the Load Latch 94. As shown by the OR Gate 43, whenever the load button 42 is activated, the View One Shot 50 and associated circuits are also activated.

Load Latch — The Load Latch 94 is set to a predetermined logic state in response to an input from the Load One Shot circuit 92. The Load Latch remains in this logic state, providing an enable signal to the Load Logic circuit 95 until the load latch is reset by the master reset line 59, from the View Load Delay 58 or Power On Clear circuit 98.

Load Logic — The Load Logic circuit 95 receives enable inputs from the Load Latch 94 and from the On Delay 60. The Load Latch input signifies a load operation is desired and the On Delay output signifies that file motor operation is ready to begin; that is, any previously selected microfische has been returned to the file and file motor field has been initiated. When signals from both the Load Latch 94 and the On Delay 60 are present, the Load Logic 95 provides an output to the View Load Delay 58 which comprises a resettable timing circuit that automatically terminates file motor operation after a predetermined time interval such that the selected microfische is positioned for easy access.

To effect a load operation, the code of the desired microfische is entered via a keyboard 22 (FIG. 1). The view button 20 is then activated to effect selection of the desired microfische. Next, the load button 42 is activated and the microfische correctly positioned for the loading operation.

Platen Solenoid Control — The purpose of the Platen Solenoid Control circuit 96 is to position the microfische close to the lens for good focus and viewing qualities during display. However, during those times when the microfische is changing position as a result of either the X or Y servo motors being activated, damage could occur to the microfische by scratching or rubbing unless the microfische is moved away from the lens. The Platen Solenoid Control circuit 96 receives inputs from both the X Control circuit 88 and the Y Control circuit 80 to ensure that the microfische is positioned away from the lens when either servo motor or both are activated.

Power Supply — The Power Supply 97 operates off of a plus and minus volt supply and functions to supply full wave rectified unfiltered plus and minus 12-½ volts for the servo control circuits, plus and minus 14 volts for the servo motors, plus and minus 20 volts for various control functions, and plus 5 volts DC for all logic.

Power On Clear — The Power On Clear circuit 98 provides a reset pulse to the View Latch 52 and the Load Latch 94 whenever the display system is initially tuned on to insure that a view cycle may be initiated.

A more detailed description of the data retrieval and display system above described and circuits that may be utilized to accomplish the functions of FIG. 3 may be found in copending application Ser. No. 104,038 entitled "Automatic Data Retrieval and Display System" filed concurrently herewith and assigned to the same assignee.

An illustrative embodiment of the timing circuit of the present invention has been described herein. It will be appreciated by a person skilled in the art, however, that various modifications to the details of construction may be made without departing from the scope of the invention.

What is claimed is:

1. A resettable timing circuit for providing output signals after a preset delay comprising in combination:

a. a timing circuit means comprising a first transistor, the base of said transistor forming an input terminal for initiating a timing cycle; a second transistor, the output of said second transistor providing an enable pulse; and a resistance-capacitor delay circuit connecting the output of said first transistor to the base of said second transistor, said delay circuit defining a discharge time constant that controls said second transistor to provide an enable signal at the termination of said timing cycle;

b. an output circuit providing an output pulse in response to said enable signal which comprises a third transistor having its base coupled to the output of said second transistor through a resistor-capacitor network whereby the duration of said output pulse is controlled by the time constant of said resistor-capacitor network coupling circuit; and c. reset means comprising a fourth transistor having its emitter-collector circuit connected across the resistor of said resistor-capacitor delay circuit and its base connected to a potential which holds said fourth transistor in a nonconductive state, and a fifth transistor connected to produce a voltage at the base of said fourth transistor to cause said fourth transistor to become conductive in response to a control signal to the base of said fifth transistor thereby to immediately discharge the capacitance of said resistor-capacitor delay circuit and to initiate said enable signal prior to the termination of said preset delay.

* * * * *